United States Patent [19]

Vachon

[11] 3,853,820

[45] Dec. 10, 1974

[54] BLENDS OF LINEAR WATER-DISSIPATABLE POLYESTERS AND ALIPHATIC OR CYCLOALIPHATIC DICARBOXYLIC ACIDS

[75] Inventor: Raymond N. Vachon, Kingsport, Tenn.

[73] Assignee: Eastman Kodak Company, Rochester, N.Y.

[22] Filed: July 23, 1973

[21] Appl. No.: 381,815

[52] U.S. Cl... 260/75 T, 117/138.8 A, 117/138.8 F, 117/138.8 N, 117/143 A, 117/161 K, 252/8.7, 260/31.8 XA, 260/75 S
[51] Int. Cl. ..................... C08g 17/06, D06m 15/00
[58] Field of Search........... 260/75 T, 75 S, 8.7, 8.6, 260/29.2 E, 31.2 XA, 31.8 XA

[56] References Cited
UNITED STATES PATENTS

| | | | |
|---|---|---|---|
| 3,385,811 | 5/1968 | Carrington et al. | 260/755 X |
| 3,546,008 | 12/1970 | Shields et al. | 117/138.8 F |
| 3,563,942 | 2/1971 | Heiberger | 260/755 X |
| 3,734,874 | 5/1973 | Kibler et al. | 260/755 X |
| 3,779,993 | 12/1973 | Kibler et al. | 260/755 |

FOREIGN PATENTS OR APPLICATIONS

| | | | |
|---|---|---|---|
| 1,128,594 | 4/1962 | Germany | 260/75 S |

*Primary Examiner*—Melvin Goldstein
*Assistant Examiner*—W. C. Danison
*Attorney, Agent, or Firm*—Elliot Stern; Daniel B. Reece, III

[57] ABSTRACT

Blends of linear water-dissipatable polyesters and aliphatic or cycloaliphatic dicarboxylic acids, said water-dissipatable polyesters being derived from at least one dicarboxylic acid component, at least one diol component, at least 20 mole percent of said diol being a poly(ethylene glycol), and a difunctional monomer containing a $-SO_3M$ group attached to an aromatic nucleus, wherein M is hydrogen or a metal ion. These blends are useful as hot-melt sizes for textile yarns, and other products which can be applied from a melt and then dissolved, dispersed or otherwise dissipated in cold water, hot water, or aqueous solutions.

6 Claims, No Drawings

BLENDS OF LINEAR WATER-DISSIPATABLE POLYESTERS AND ALIPHATIC OR CYCLOALIPHATIC DICARBOXYLIC ACIDS

This invention relates to hot melt sizing compositions and to fibrous articles sized therewith. In one of its more specific aspects, this invention relates to hot melt sizing composition blends for textile yarns made from linear water-dissipatable polyesters blended with certain specific aliphatic or cycloaliphatic dicarboxylic acids.

When textile materials are to be used in the form of multifilament yarns for the fabrication of textile material, it is desirable before the weaving process to treat the warp yarns with a sizing composition. This treatment strengthens the yarns and renders them more resistant to abrasion during the subsequent weaving operations. It is especially important that the sizing composition imparts abrasion resistance to the yarns during weaving because abrasion tends to sever the yarn and to produce end breaks which lower the quality of the final woven product. It is also important that the sizing composition be one which can be subsequently removed from the yarn by scouring.

Various high-molecular weight materials have been suggested as sizing agents for yarns. Among such materials are gelatin, sodium polyacrylate, polyvinyl alcohol, and the sodium salt of a 50/50 maleic anhydride-styrene copolymer. U.S. Pat. No. 3,546,008 and U.S. Pat. No. 3,734,874 describe fibrous articles which are sized with sizing compositions comprising linear, water-dissipatable polyesters derived from at least one dicarboxylic acid component, at least one diol component, at least 20 mole percent of said diol component being a poly(ethylene glycol) and a difunctional monomer containing a —$SO_3M$ group attached to the aromatic nucleus, wherein M is hydrogen or a metal ion. These sizing materials are easily adhered to textile materials from a water-dissipation wherein the compositions thereof are dispersed or dissipated in water and the fiber is drawn through the dissipation, woven and then removed from the woven fabric with scouring. While these sizes are useful for their intended purpose, they have a serious drawback in that they must be put on the fiber from the water-dissipation. An advantage of the polyester dicarboxylic acid blends of this invention is that they may be applied to the fibers directly from the melt and are easily removed at the end of the finishing operation by dissolution in water. The prior sizes cannot be advantageously applied as a hot melt in that their high melt viscosities render them unsuitable for this method of application. The compositions of this invention are advantageously useful for hot melt application to textile warp yarns. These compositions set up rapidly to nontacky films which serve as protective coatings for warp yarns during weaving on conventional looms.

According to one aspect of this invention, there is provided a composition comprising, based on the weight of the composition, a blend of components I and II as follows:

I. from about 60 to about 95 weight percent of a linear, water-dissipatable polyester derived essentially from components (A), (B) and (C) as follows:
A. at least one dicarboxylic acid,
B. at least one diol, at least 20 mole percent of said diol component being a poly(ethylene glycol) having the formula H—($OCH_2CH_2$)$_n$—OH wherein n is an integer of from 2 to about 14, and C. at least one difunctional dicarboxylic acid sulfomonomer containing a —$SO_3M$ group attached to an aromatic nucleus, wherein M is hydrogen, $Na^+$, $Li^+$, $K^+$, or a combination thereof, said sulfomonomer component constituting at least about 8 mole percent to about 45 mole percent of the sum of the moles of said components (A) and (C), and II. from about 40 to about 5 weight percent of a saturated aliphatic or cycloaliphatic dicarboxylic acid having from 6 to 12 carbon atoms.

In a preferred embodiment of this invention there is provided the above-mentioned composition wherein the dicarboxylic acid is present in the range of from 40 to about 30 weight percent, said dicarboxylic acid being selected from the group consisting of sebacic acid, suberic acid and dodecanedioic acid. In an especially preferred embodiment of this invention the dicarboxylic acid additive is sebacic acid.

It has been discovered that the above-described compositions are effective as sizes when applied from a hot melt to a variety of natural and synthetic textile yarns. Examples of such yarns include those made from polyesters such as poly(ethylene terephthalate) and poly(1,4-cyclohexylenedimethylene terephthalate), cotton, rayon, cellulose acetate, nylon, and polypropylene or blends of these fibers, etc. Therefore, although this invention will be illustrated by reference to polyester/cotton spun yarns, the sizing compositions of this invention may be used on these other types of textile materials.

The sizes of this invention meet the requirements for an effective water-dissipatable hot melt size:

1. The size compositions must adhere the fiber bundle being sized.
2. The sizing composition has a low melt viscosity at the application temperature.
3. The sizing composition sets up rapidly from the molten state to a solid tack-free state on a substrate that is a poor heat conductor.
4. The sizing composition is a film former and has good tensile strength and elongation. The tensile and elongation properties should not be appreciably altered by humidity changes.
5. The sizing composition is easily removed in hot water or water made slightly alkaline.
6. The sizing composition is stable at the temperature of application for several minutes.

The linear water-dissipatable polyester component of the blends of this invention is derived from at least one dicarboxylic acid component, at least one diol component, at least 20 mole percent of said diol component being a poly(ethylene glycol), and a difunctional monomer containing a —$SO_3M$ group attached to an aromatic nucleus, wherein M is hydrogen or a metal ion. These polyesters are fully disclosed in U.S. Pat. Nos. 3,546,008 and 3,734,874.

The dicarboxylic acid component from which the linear water-dissipatable polyester component of this invention is prepared can be any aliphatic, cycloaliphatic, or aromatic acid. Examples of such dicarboxylic acids include oxalic; malonic; dimethylmalonic; succinic; glutaric; adipic; trimethyladipic; pimelic; 2,2-dimethylglutaric; azelaic; sebacic; fumaric; maleic;

itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sulfonyldibenzoic; and 2,5-naphthalenedicarboxylic acids. In a preferred embodiment of this invention isophthalic acid is the dicarboxylic acid utilized. If terephthalic acid is used as the dicarboxylic acid component of the polyester, especially good results are achieved when at least five mole percent of one of the other acids listed above is used.

It should be understood that the use of the corresponding acid anhydrides, esters, and acid chlorides of these acids is included in the term "dicarboxylic acid." The esters are preferred, examples of which include dimethyl 1,4-cyclohexanedicarboxylate; dimethyl 2,6-naphthalenedicarboxylate; dibutyl 4,4'-sulfonyldibenzoate; dimethyl isophthalate; dimethyl terephthalate; and diphenyl terephthalate. Copolyesters may be prepared from two or more of the above dicarboxylic acids or derivatives thereof.

At least about 20 mole percent of the diol component used in preparing the water-dissipatable polyester component of the invention is a poly(ethylene glycol) having the formula

wherein n is an integer of from two to about 14. Examples of suitable poly(ethylene glycols) include diethylene, triethylene, tetraethylene, pentaethylene, hexaethylene, heptaethylene, octaethylene, nonaethylene, and decaethylene glycols, and mixtures thereof. Preferably the poly(ethylene glycol) employed in the polyester of the present invention is diethylene glycol, triethylene glycol, or mixtures thereof. The remaining portion of the diol component is at least one aliphatic, cycloaliphatic, or aromatic diol. Examples of these diols include ethylene glycol; propylene glycol; 1,3-propanediol; 2,4-dimethyl-2-ethylhexane-1,3-diol; 2,2-dimethyl-1,3-propanediol, 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; 1,2-cyclohexanedimethanol; 2,2,4,4-tetramethyl-1,3-cyclobutanediol; and p-xylylenediol. Copolymers may be prepared from two or more of the above diols.

A third component used to prepare the polyester sizing composition is a difunctional monomer containing a —SO₃M group attached to an aromatic nucleus, wherein M is hydrogen or a metal ion. This difunctional monomer component may be either a dicarboxylic acid (or derivative thereof) containing a —SO₃M group or a diol containing a —SO₃M group. The metal ion of a sulfonate salt group may be Na⁺, Li⁺, or K⁺. It is possible to prepare the polyester using, for example, a sodium sulfonate salt and later by ion-exchange replace this ion with a different ion (for example, calcium) and thus alter the characteristics of the polyester.

The —SO₃M group is attached to an aromatic nucleus, examples of which include benzene, naphthalene, anthracene, diphenyl, oxydiphenyl, sulfonyldiphenyl, and methylenediphenyl.

Especially good results are obtained when the difunctional monomer is the sodium salt of a sulfoisophthalic, sulfoterephthalic, sulfophthalic, or 4-sulfonaphthalene-2,7-dicarboxylic acid (or derivatives of such acids). A highly preferred monomer is 5-sodiosulfoisophthalic acid or a derivative thereof such as 5-sodiosulfodimethyl isophthalate. Another preferred difunctional monomer is 5-sulfoisophthalic acid.

Other effective difunctional monomers containing a —SO₃M group attached to an aromatic nucleus include metal salts of aromatic sulfonic acids (or esters thereof). These monomers have the general formula

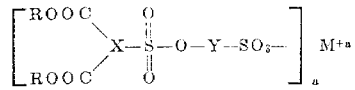

wherein X is a trivalent aromatic hydrocarbon radical, Y is a divalent aromatic hydrocarbon radical, R is hydrogen or an alkyl group of one to four carbon atoms, M is hydrogen, Na⁺, Li⁺, or K⁺, and a is 1, 2 or 3. These monomers are described, including methods for their preparation, in U.S. Pat. No. 3,528,947, patented on Sept. 15, 1970. Examples of preferred monomers are 4-sodiosulfophenyl-3,5-dicarbomethoxybenzenesulfonate, 4-lithiosulfophenyl-3,5-dicarbomethoxybenzenesulfonate; and 6-sodiosulfo-2-naphthyl-3,5-dicarbomethoxybenzenesulfonate.

Other effective difunctional monomers containing a —SO₃M group attached to an aromatic nucleus include metal salts of sulfodiphenyl ether dicarboxylic acids (or esters thereof). These monomers have the general formula

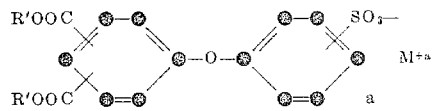

wherein R¹ is hydrogen, an alkyl group of one to eight carbon atoms, or phenyl, M is hydrogen, Na⁺, Li⁺, or K⁺, and a is 1, 2, or 3. These monomers are described, including methods for their preparation, in Defensive Publication, 868 O.G. 730. Examples of preferred monomers here are dimethyl 5-[4-(sodiosulfo)phenoxy]isophthalate, dimethyl 5-[4-(sodiosulfo)phenoxy]-terephthalate, and 5-[4-(sodiosulfo)phenoxy]isophthalic acid.

When the difunctional monomer containing the —SO₃M groups is an acid or derivative thereof (such as its ester), the polyester should contain at least about eight mole percent of the monomer based on total acid content, with more than ten mole percent giving particularly advantageous results. When the difunctional monomer is a diol, the polyester should also contain at least about eight mole percent of the monomer based on total diol content, with more than ten mole percent giving particularly advantageous results. Greater dissipatability is achieved when the difunctional monomer constitutes from about 12 mole percent to about 45 mole percent of the total content of acid or diol components of the polyester.

To obtain the polyester components of this invention, the difunctional monomer containing the —SO₃M group may be added directly to the esterification reaction mixture from which the polyester will be made. Thus, these monomers can be used as a component in the original polyester reaction mixture. Other various processes which may be employed in preparing these sizing compositions are well known in the art and are illustrated in such U.S. Pat. Nos. as 2,465,319; 3,018,272; 2,901,466; and 3,075,952. These patents illustrate ester interchange and polymerization processes.

The linear water-dissipatable polyester/dicarboxylic acid blend compositions of this invention will have an inherent viscosity (I.V.) from at least about 0.2 and preferably at least 0.3 to at least about 0.5 as measured at 25°C. using 0.50 gram of polymer per 100 ml. of a solvent composed of 60 percent phenol and 40 percent tetrachloroethane and a melt viscosity of from about 800 to about 8,000 cp. at 160°C. Preferably, the melt viscosity is from about 800 to about 7,000 cp. at 160°C.

The dicarboxylic acid component of the blend of this invention can be obtained commercially or prepared by methods well known in the art. Examples of the 6 to 12 carbon atom aliphatic or cycloaliphatic dicarboxylic acids that can be used in this invention are adipic acid, pimelic acid, sebacic acid, azelaic acid, suberic acid, 1,12-dodecanedioic acid, 1,3-cyclohexanedicarboxylic acid, etc. It has been found that acids having a carbon number lower than adipic acid are unsuitable for use in this invention because of their high volatility at the application temperature.

Various additives may be incorporated into the sizing compositions to achieve specific results. Examples of such additives include plasticizers, e.g., toluenesulfonamide, methanesulfonamide, etc., lubricants and/or antistatic agents and antioxidants.

Blending of the linear water-dissipatable component of this invention with the dicarboxylic acid component of this invention may be carried out by various common procedures, including blending on hot rolls, mixing in the melt, or mixing in solution and then removing the solvent. In some situations, it may be desirable to heat the mixture to obtain solution. After solution is attained, the solvent, if used, may be removed by distillation under reduced pressure and the last traces may be removed by extraction. On a laboratory scale, the blends may be prepared by melt blending the components in a test tube or flask under nitrogen at 160°C. until the melt is homogeneous.

Whenever the term "inherent viscosity" (I.V.) is used in this description, it will be understood to refer to viscosity determinations made at 25°C. using 0.5 gram of polymer per 100 ml. of a solvent composed of 60 percent phenol and 40 percent tetrachloroethane as parts by weight. In addition, whenever the terms "dissipatable," "dissipated" or "dissipate," are used in this description, it will be understood to refer to the activity of a water, aqueous or caustic aqueous solution on the polyester/dicarboxylic acid blend. The terms are specifically intended to cover those situations wherein the solution dissolves and/or disperses the polyester blends of this invention. Furthermore, whenever the word "water" is used in this description, it includes not only aqueous solutions but also hot aqueous solutions and caustic aqueous solutions.

Test Methods

Melt Viscosity — Melt viscosity measurements are made in a Brookfield Thermosel unit. This apparatus uses a Model LVT Brookfield Viscometer equipped with a No. SC4-31 spindle. The No. SC4-31 spindle is run at 30 rpm. for viscosities around 1,000 cp. Lower rpm. values are used for polymers of higher melt viscosity. Twenty minutes after beginning the test, readings are made until there is close agreement between three successive determinations.

Flow Point — The flow point of the polymers and blends is determined by placing a film of the material between two glass covers on a microscope hot stage. The temperature at which the polymers soften sufficiently so that the cover glasses can slide past one another with little or no pressure is used as the flow point.

Tensile Properties — The tensile properties of the polymers and blends are determined on 5-mil films at 50 percent RH, at a loading rate of 1 in./min. Films are formed at 120°–140°C., depending on the melt viscosity of the blend, between layers of silicone release paper. A 3-mil stainless steel template is placed between the layers of silicone release paper in order to obtain film thicknesses around 4–5 mils. Force to yield, force to break and elongation to break are measured on each film at a crosshead speed of 1 in./min.

Water Dissipatability — Water dissipatability (which is a measure of the material's desizability) is determined by dropping a 1-in. square of the 5-mil film into 150 ml. of water at 160°F. in a 250-ml. beaker. The water is stirred with a 1-in. magnetic stirring bar, and the time required for the film to disperse or dissipate completely is noted.

TACK-FREE TIME (SET-UP RATE)

Tacky to Touch — A metal spatula is inserted into a test tube of the molten size at 160°C. for a time sufficient to allow the blade to reach the melt temperature. The spatula is then used to quickly spread a thin film of the molten size over a piece of silicone release paper resting on a laboratory bench top. The film is immediately tested for tackiness by touching the film with the finger tip. The film should not be tacky within 1 second after the film is spread. The time required for the film to become nontacky to the touch is reported as the set-up rate.

Film-to-Film Tackiness — The same procedure as described above is used except that the silicone release paper is folded over on itself after the size film is spread. The film should not stick to itself 1 second after spreading.

Melt Stability — The melt stability is determined by holding the sizing composition at 355°F. in air for 30 minutes. After this time the size is retested to determine whether any changes in set-up rate, melt viscosity or water dispersibility have occurred.

In order to determine whether any volatile material is coming off from the melt, 2 g. of polymer are placed in a 25 × 150-mm. test tube and heated at 160°C. It is noted whether any condensate or sublimate collects on the sides of the test tube.

The following examples are included for a better understanding of this invention.

EXAMPLE 1

A mixture of 48.5 grams (0.25 mole) of dimethyl isophthalate, 24.2 grams (0.125 mole) of dimethyl terephthalate, 15 grams (0.075 mole) of hexahydroisophthalic acid, 14.8 grams (0.05 mole) of dimethyl 5-sodiosulfoisophthalate, 68.9 grams (0.65 mole) of diethylene glycol, and 0.8 ml. of a 21 percent catalyst solution of titanium isopropoxide is stirred and heated at 200°C. and a vacuum of 0.3 mm. is applied. Heating and stirring is continued for one hour under these conditions. After cooling the polymer obtained has an I.V. of 0.53 and is tough and rubbery.

EXAMPLE 2

Mixtures containing 60, 65, and 70 weight percent of the polymer prepared in Example 1 and 40, 35 and 30 percent adipic acid, respectively, are melt blended at 160°C.

An antioxidant, Irganox 1010 (Reg. Trademark Ciba-Geigy), is added to the mixtures before blending at a concentration of 0.2 percent based on the weight of polymer in the blend. Thin films of the melts set up rapidly to films that are nontacky, have good elongation, strength and flexibility and are readily dissipated in hot water.

When a spun polyester/cotton yarn is sized with the above blends at a rate of 10 ft./min., the sized yarn has good lay-down and good resistance to abrasion.

EXAMPLE 3

Mixtures containing 60, 65 and 70 weight percent of a water-dissipatable polyester prepared as in Example 1 (a 90/10 mole percent copolyester of isophthalic acid and 5-sodiosulfoisophthalic acid and diethylene glycol) and 40, 35 and 30 percent sebacic acid, respectively, are melt blended at 160°C.

An antioxidant, Irganox 1010 (Reg. Trademark Ciba-Geigy), is added to the mixtures before blending at a concentration of 0.2 percent based on the weight of polymer in the blend.

Thin films of the melts set up rapidly to films that are nontacky, have good elongation, strength and flexibility and are readily dissipated in hot water.

When a spun polyester/cotton yarn is sized with the above blends at a rate of 10 ft./min., the sized yarn has good lay-down and good resistance to abrasion.

The following Table I shows the properties of the blends of this Example:

TABLE I

| Property | 60% WDX*/ 40% Sebacic Acid | 65% WDX/ 35% Sebacic Acid | 70% WDX/ 30% Sebacic Acid |
| --- | --- | --- | --- |
| Melt Viscosity, cp. (160°C.) [Initial/(a)] | 1780/1660(a) | 2400/1450(a) | 7300/3430(a) |
| Flow Point, °C. | 105–110° | 110–115° | 110–112° |
| Set-Up Rate (Sec.) | < 1 Sec. | < 1 Sec. | < 1 Sec. |
| Tensile Strength, (PSI) | 717 | 583 | 808 |
| Elongation (%) | 12 | 61 | 206 |
| Water Dissipatability (Sec.) | 45 | 25 | 15 |
| Dissipatability in 0.25% $Na_2CO_3$ (Sec.) | 35 | 25 | 15 |
| Melt Stability | Initial I.V. = 0.38 Final I.V. = 0.35 | Initial I.V. = 0.39 Final I.V. = 0.31 | Initial I.V. = 0.40 Final I.V. = 0.34 |
| Volatilization | Slight | Slight | Slight |

*Polyester Prepared in Example 3 (a 90/10 Mole Percent Copolyester of Isophthalic Acid/5-Sodiosulfoisophthalic Acid and Diethylene Glycol)
(a)Melt viscosity of blend at 160°C. after the sample was held 30 minutes in air at 180°C.

EXAMPLE 4

A mixture of 70 weight percent of the water-dissipatable polyester of Example 3, I.V. = 0.42, 20 weight percent sebacic acid and 10 percent p-toluenesulfonamide is melt blended at 160°C. 0.2 Percent Irganox 1010 (on weight of polymer) is added to the mixture before blending. A thin film of the melted blend sets up rapidly to a nontacky, tough, flexible film that has good elongation, strength and water dispersibility. This material also is useful as a hot melt size.

EXAMPLES 5–15

The following Table II shows the properties of a number of polymer blends of this invention.

TABLE II

| Example | Composition % WDX(a)/% Dicarboxylic Acid | I.V.(b) | Flow Point °C. | Force To Yield (PSI) | Force To Break (PSI) | Elongation To Break (%) |
| --- | --- | --- | --- | --- | --- | --- |
| 5 | 100% WDX/0 | 0.42 | — | None | 602 | 413 |
| 6 | 60% WDX/40% Adipic Acid | 0.41 | 115–120° | 587 | 640 | 72 |
| 7 | 65% WDX/35% Adipic Acid | — | 114° | 590 | 733 | 59 |
| 8 | 70% WDX/30% Adipic Acid | 0.40 | 113–115° | 610 | 653 | 159 |
| 9 | 60% WDX/40% Azelaic Acid | 0.43 | — | 387 | 320 | 125 |
| 10 | 65% WDX/35% Azelaic Acid | — | — | 497 | 480 | 300 |
| 11 | 70% WDX/30% Azelaic Acid | 0.43 | — | 663 | 687 | 226 |
| 12 | 60% WDX/40% Sebacic Acid | 0.43 | 115° | 867 | 783 | 46 |
| 13 | 65% WDX/35% Sebacic Acid | — | 110–113° | 933 | 858 | 141 |
| 14 | 70% WDX/30% Sebacic Acid | 0.43 | 110–115° | 1060 | 847 | 151 |
| 15 | 70% WDX/30% 1,12 Dioic Acid* | — | — | 543 | 813 | 109 |

(a)Copolyester of 90 Mole % Isophthalic Acid, 10 Mole % 5-Sodiosulfoisophthalic Acid and 100 Mole % Diethylene Glycol
(b)I.V. is corrected for the amount of polymer in the blend
*1,12 Dioic = 1,12 Dodecanedioic Acid

EXAMPLE 16

The following Table III shows the properties of a number of polyester compositions made from difunctional monomers containing 13 $SO_3M$ groups. All are made by the general procedure of Example 1.

TABLE III

| Polymer | Dicarboxylic Acid | Mole Percent | Sulfonate | Mole Percent | Diol | Mole Percent | I.V. |
|---|---|---|---|---|---|---|---|
| A | Isophthalic<br>Terephthalic<br>Hexahydroisophthalic | 52.5)<br>25)<br>15) | SIP[1] | 7.5 | DEG[3] | 100 | 0.54 |
| B | Isophthalic | 90 | SIP | 10 | DEG | 100 | 0.53 |
| C | Hexahydroterephthalic | 90 | SIP | 10 | DEG | 100 | 0.73 |
| D | Isophthalic<br>Terephthalic<br>Hexahydroisophthalic | 50)<br>25)<br>15) | SIP | 10 | (DEG<br>(EG[3] | 80)<br>20) | 0.60 |
| E | Isophthalic<br>Terephthalic<br>Hexahydroisophthalic | 50)<br>25)<br>15) | (4) | 10 | DEG | 100 | 0.42 |
| F | Isophthalic | 90 | (5) | 10 | DEG | 100 | 0.48 |
| G | Isophthalic<br>Hexahydroterephthalic | 60)<br>30) | (5) | 10 | DEG | 100 | 0.55 |
| H | Isophthalic | 90 | (6) | 10 | DEG | 100 | 0.42 |
| I | Terephthalic | 92 | SIP | 8 | TEG[7] | 100 | 0.33 |
| J | Isophthalic | 92 | SIP | 8 | TEG | 100 | 0.59 |
| K | do. | 90 | SIP | 10 | (CHDM[8]<br>(DEG | 30)<br>70) | 0.45 |
| L | Adipic | 90 | SIP | 10 | DEG | 100 | 0.69 |
| M | Isophthalic | 90 | SIP | 10 | (CHDM<br>(DEG | 50)<br>50) | 0.48 |
| N | do. | 90 | SIP | 10 | (CHDM<br>(DEG | 60)<br>40) | 0.51 |
| O | do. | 80 | SIP | 20 | (CHDM<br>(DEG | 70)<br>30) | 0.32 |
| P | do. | 80 | SIP | 20 | (CHDM<br>(DEG | 60)<br>40) | 0.38 |

[1] SIP—5-sodiosulfoisophthalic acid.
[2] DEG—diethylene glycol.
[3] EG—ethylene glycol.
[4] 4-sodiosulfophenyl-3,5-dicarboxybenzene sulfonate,

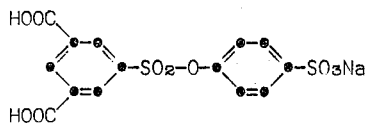

[5] 5-[4-(sodiosulfo)phenoxy]isophthalic acid,

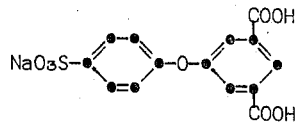

[6] 2(2'-sodiosulfophenyl)-2-ethylmalonic acid,

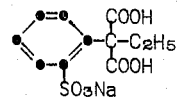

[7] TEG—triethylene glycol.
[8] CHDM—1,4-cyclohexanedimethanol.

EXAMPLE 17

The polyesters prepared in Example 16 are blended with 40, 35, and 30 weight percent of suberic acid and azelaic acid, respectively, as in a manner described in Example 2. Similarly advantageous results are obtained when these blends are sized on spun polyester/cotton yarn.

EXAMPLE 18

A mixture containing 65 weight percent of a polyester of 90 mole percent terephthalic acid, 10 mole percent 5-sodiosulfoisophthalic acid, 75 mole percent triethylene glycol and 25 mole percent cyclohexanedimethanol and 35 weight percent of sebacic acid is prepared in a manner as described in Examples 1 and 2.

The blend thus prepared has an elongation of 397 percent, a force to yield of 370 psi., and a force to break of 410. Advantageous results are obtained when this blend is sized on spun polyester/cotton yarn. The yarn exhibits good lay-down and good resistance to abrasion.

The invention has been described in detail with particular reference to preferred embodiments thereof, but it will be understood that variations and modifications can be effected within the spirit and scope of the invention.

I claim:

1. Composition comprising, based on the weight of the composition, a blend of components I and II as follows:
   I. from about 60 to about 95 weight percent of a linear, water-dissipatable polyester derived essentially from components (A), (B) and (C) as follows:
   A. at least one aliphatic, cycloaliphatic or aromatic dicarboxylic acid,
   B. at least one diol, at least 20 mole percent of said diol component being a poly(ethylene glycol) having the formula $H{-}(OCH_2CH_2)_n{-}OH$ wherein n is an integer of from 2 to about 14, and
   C. at least one difunctional dicarboxylic acid sulfomonomer containing a $-SO_3M$ group attached to an aromatic nucleus, wherein M is hydrogen, or $Na^+$, $Li^+$, $K^+$, or a combination thereof, said sulfomonomer component constituting at least about 8 mole percent to about 45 mole percent of the sum of the moles of said components (A) and (C), and
   II. from about 40 to about 5 weight percent of a saturated aliphatic or cycloaliphatic dicarboxylic acid having from 6 to 12 carbon atoms.

2. Composition of claim 1 wherein component II is selected from sebacic acid, suberic acid, adipic acid, or azelaic acid.

3. The composition of claim 2 wherein the water-dissipatable polyester is derived essentially from components A, B, and C as follows:
   A. at least one dicarboxylic acid selected from isophthalic acid, adipic acid, hexahydroterephthalic acid, or mixtures thereof,
   B. at least one diol selected from diethylene glycol, triethylene glycol or a mixture of diethylene glycol and ethylene glycol,
   C. at least one difunctional dicarboxylic acid selected from 5-sodiosulfoisophthalic acid, 4-sodiosulfophenyl-3,5-dicarboxybenzene sulfonate, 5-[4-(sodiosulfo)phenoxy]isophthalic acid or 2(2'-sodiosulfophenyl)-2-ethylmalonic acid.

4. Composition of claim 3 wherein said water-dissipatable polyester is derived essentially from components A, B, and C as follows:
   A. isophthalic acid,
   B. diethylene glycol, and
   C. 5-sodiosulfoisophthalic acid.

5. Composition of claim 4 wherein the water-dissipatable polyester is derived essentially from components A, B, and C as follows:
   A. about 90 mole percent isophthalic acid,
   B. 100 mole percent diethylene glycol, and
   C. about 10 mole percent of 5-sodiosulfoisophthalic acid.

6. Composition of claim 5 wherein component II is sebacic acid.

* * * * *

Notice of Adverse Decision in Interference

In Interference No. 99,432, involving Patent No. 3,853,820, R. N. Vachon, BLENDS OF LINEAR WATER-DISSIPATABLE POLYESTERS AND ALIPHATIC OR CYCLOALIPHATIC DICARBOXYLIC ACIDS, final judgment adverse to the patentee was rendered Apr. 14, 1977, as to claims 1–6.

[*Official Gazette August 2, 1977.*]